(12) United States Patent
Lee

(10) Patent No.: US 7,492,745 B2
(45) Date of Patent: Feb. 17, 2009

(54) COMPUTER, ACCESS POINT, NETWORK AND CONTROL METHODS THEREOF

(75) Inventor: Youne-sang Lee, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 591 days.

(21) Appl. No.: 11/133,466

(22) Filed: May 20, 2005

(65) Prior Publication Data

US 2006/0013175 A1    Jan. 19, 2006

(30) Foreign Application Priority Data

May 20, 2004    (KR)    ...................... 10-2004-0036137

(51) Int. Cl.
*H04Q 7/20* (2006.01)
(52) U.S. Cl. .................. 370/338; 370/310; 370/328
(58) Field of Classification Search ................ 455/310, 455/328, 329, 333, 338, 345, 346, 354, 356, 455/469, 411, 414.1, 517; 380/270
See application file for complete search history.

(56) References Cited

U.S. PATENT DOCUMENTS

2003/0200455 A1    10/2003  Wu
2003/0224797 A1    12/2003  Kuan et al.
2004/0008652 A1     1/2004  Tanzella et al.

FOREIGN PATENT DOCUMENTS

| JP | 2000-349787 | 12/2000 |
| JP | 2001-136172 | 5/2001 |
| JP | 2001-298467 | 10/2001 |
| JP | 2003-244055 | 8/2003 |
| KR | 2003-0017455 | 3/2003 |
| KR | 2003-0045569 | 6/2003 |
| KR | 2003-0080417 | 10/2003 |

*Primary Examiner*—Jean A Gelin
(74) *Attorney, Agent, or Firm*—Staas & Halsey LLP

(57) ABSTRACT

A network system including a host having a first network module, and a first controller checking a data transmitting/receiving state of the first network module and outputting operation state data corresponding to the data transmitting/receiving state through the first network module, and a client having a display, a second network module connected to the host and receiving the operation state data from the host, and a second controller controlling the display to display information about the data transmitting/receiving state of the first network module of the host on the basis of the operation state data received through the second network module. With this configuration, embodiments of the present invention provide a computer, an access point, a network system and a control method thereof, where a host can provide data about its data transmitting/receiving state to a client, thereby allowing a user to check the data transmitting/receiving state of the host.

23 Claims, 8 Drawing Sheets

COMPUTER, ACCESS POINT, NETWORK AND CONTROL METHODS THEREOF

CROSS-REFERENCE TO RELATED APPLICATIONS

This application claims the priority benefit of Korean Patent Application No. 2004-0036137, filed May 20, 2004, in the Korean Intellectual Property Office, the disclosure of which is incorporated herein by reference.

BACKGROUND OF THE INVENTION

1. Field of the Invention

The present invention relates to a computer, an access point, a network system and methods therefor, and more particularly, to a computer, an access point, a network system and methods therefor where a host provides data about its data transmitting/receiving state to a client, thereby allowing the client to check the data transmitting/receiving state of the host.

2. Description of the Related Art

As network technology such as the Internet has been recently developing, the utility of computers is looming large. Particularly, as the use of portable computers, e.g., a laptop computer, a personal digital assistant (PDA), a tablet computer, etc., has recently spread, access of the Internet environment through a wireless network such as wireless local area network (LAN), for example, has also been rapidly developing. Therefore, a user can receive diverse information and services through the wireless network while traveling.

Generally, a wireless network system includes a client, such as a computer, receiving services through the wireless network, and an access point (AP) enabling wireless communication with the computer, as well as to relay between the computer and a wired network system, i.e., non-wireless.

In such a wireless network system, one of the computer, the access point and a network server may be in trouble. For example, when the access point may be in the trouble, a user cannot access the wireless network system through the computer.

However, in conventional wireless network systems, even though some trouble arises while a user accesses the wireless network system through the computer, there is no way to determine what element among the computer, the access point and the network server is in the cause of trouble.

Further, when the user has insufficient knowledge of the wireless network system's state, a user is likely to infer that the computer is in trouble when a user cannot access the wireless network system through his/her computer, even though the access point or the network server is the real cause of the trouble.

Substantially, in computer manufacturer warranty request complaints about troubles with wireless network systems, the typical real problem is not due to a problem with the user's computer but, rather, with other elements of the wireless network, e.g., because a user uses his/her normal computer in a service area of an access point already in trouble.

Such a problem may arise in the wired network system, as well as the wireless network system. Further, because the user doesn't have enough information about the wireless or wired systems the user is likely to infer only that his/her computer is in trouble.

SUMMARY OF THE INVENTION

Accordingly, it is an aspect of the present invention to provide a computer, an access point, a network system and methods therefore where a host provides data about its data transmitting/receiving state to a client, thereby allowing the client to check the data transmitting/receiving state of the host.

Additional aspects and/or advantages of the invention will be set forth in part in the description which follows and, in part, will be obvious from the description, or may be learned by practice of the invention.

The foregoing and/or other aspects of the present invention are also achieved by providing a network system including a host comprising a first network module, and a first controller checking a data transmitting/receiving state of the first network module and outputting operation state data corresponding to the data transmitting/receiving state of the first network module; and a client including a display, a second network module connected to the host and receiving the operation state data from the host, and a second controller controlling the display to display information about the data transmitting/receiving state of the first network module of the host on the basis of the operation state data received through the second network module.

According to an embodiment of the present invention, the host further includes an access point to which the client is wirelessly connected through a wireless network.

According to an embodiment of the present invention, the first controller embeds the operation state data in a beacon signal, transmitted by the host, to transmit the operation state data.

According to an embodiment of the present invention, the first controller records the operation state data in a capability information field of a frame body of the beacon signal.

According to an embodiment of the present invention, the operation state data includes information about a first connection state corresponding to a wireless data transmitting/receiving state between at least one other client connected to the access point and the access point and/or between the client and the access point.

According to an embodiment of the present invention, the information about the first connection state includes at least one of authentication information about the client trying to access the access point, and information about a wireless data transmitting/receiving error between the access point and the client and/or between the access point and the other client.

According to an embodiment of the present invention, the information about the wireless data transmitting/receiving error includes at least one of information about a retried packet rate per a predetermined period, and information about a cyclic redundancy checking (CRC) error rate per a predetermined period.

According to another embodiment of the present invention, the network system further includes a network server connected to the access point through a wired network, wherein the operation state data includes information about a second connection state corresponding to a wired data transmitting/receiving state between the network server and the access point.

According to yet another embodiment of the present invention, the information about the second connection state includes information about an irresponsiveness rate with respect to a PING from the access point toward the network server.

According to yet another embodiment of the present invention, the operation state data includes auxiliary information to define a sub-state with respect to information about the first connection state and/or the second connection state.

According to yet another embodiment of the present invention, the network system further includes a network server connected to the access point through a wired network, wherein the operation state data includes information about a second connection state corresponding to a wired data transmitting/receiving state between the network server and the access point.

According to yet another embodiment of the present invention, the host includes a server to which the client is wire-connected.

The foregoing and/or other aspects of the present invention are also achieved by providing an access point relaying data transmission between a network server and a client, the access point including a wireless network module wirelessly communicating with the client; and a controller checking a data transmitting/receiving state related to the wireless network module and transmitting operation state data corresponding to the data transmitting/receiving state through the wireless network module.

According to another embodiment of the present invention, the controller embeds the operation state data in a beacon signal and transmits the beacon signal to the client through the wireless network module.

According to still another embodiment of the present invention, the controller records the operation state data in a capability information field of a frame body of the beacon signal.

According to still another embodiment of the present invention, the operation state data includes information about a first connection state corresponding to a wireless data transmitting/receiving state between at least one other client connected to the access point through the wireless network module and the access point and/or between the client and the access point.

According to still another embodiment of the present invention, the information about the wireless data transmitting/receiving error includes at least one of information about a retried packet rate per a predetermined period, and information about a cyclic redundancy checking (CRC) error rate per a predetermined period.

According to still another embodiment of the present invention, the access point further includes a wired network module wire-connected to and wire-communicating with the network server, wherein the operation state data includes information about a second connection state corresponding to a wired data transmitting/receiving state between the network server and the access point.

According to still another embodiment of the present invention, the operation state data includes information about a second connection state corresponding to a wired data transmitting/receiving state between the network server and the access point.

According to another embodiment of the present invention, a computer communicating with a host through a network, the computer including a display displaying a picture; a network module communicating with the host through the network; and a controller detecting operation state data from data received through the network module and controlling the display to display information about a data transmitting/receiving state of the host on the basis of the detected operation state data.

According to another embodiment of the present invention, a method of controlling a network system including a host and a client communicating with the host, the method including creating operation state data corresponding to a data transmitting/receiving state of the host; transmitting the operation state data from the host; receiving the operation state data transmitted from the host by the client; and allowing the client to display information about the data transmitting/receiving state of the host on the basis of the operation state data.

According to still another embodiment of the present invention, the host includes an access point to which the client is wirelessly connected through a wireless network, and the creating of the operation state data includes embedding the operation state data in a beacon signal.

According to still another embodiment of the present invention, the creating of the operation state data includes detecting information about a first connection state corresponding to a wireless data transmitting/receiving state between other client connected to the access point and the access point and/or between the client and the access point.

According to still another embodiment of the present invention, the detecting of the information about the first connection state includes at least one of detecting authentication information about the client trying to access the access point, and detecting information about a wireless data transmitting/receiving error between the access point and the client and/or between the access point and the other client.

According to still another embodiment of the present invention, the detecting of the information about the wireless data transmitting/receiving error includes at least one of detecting information about a retried packet rate per a predetermined period, and detecting information about a cyclic redundancy checking (CRC) error rate per a predetermined period.

According to still another embodiment of the present invention, the network system includes a network server connected to the access point through a wired network, and the creating of the operation state data includes detecting information about a second connection state corresponding to a wired data transmitting/receiving state between the network server and the access point.

According to still another embodiment of the present invention, the detecting of the information about the second connection state includes calculating an irresponsiveness rate with respect to a PING from the access point toward the network server.

According to still another embodiment of the present invention, the network system includes a network server connected to the access point through a wired network, and the creating of the operation state data includes detecting information about a second connection state corresponding to a wired data transmitting/receiving state between the network server and the access point.

BRIEF DESCRIPTION OF THE DRAWINGS

The above and/or other aspects and advantages of the present invention will become apparent and more readily appreciated from the following description of the embodiments, taken in conjunction with the accompany drawings of which.

DETAILED DESCRIPTION OF THE PREFERRED EMBODIMENTS

Figure 1:
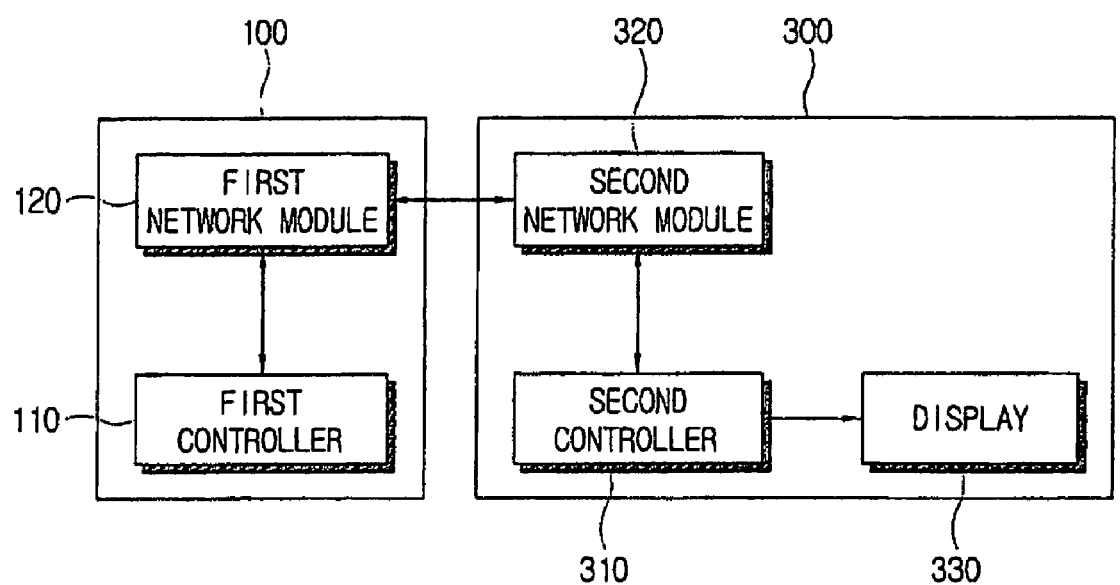
FIG. 1 is a control block diagram of a network system, according to an embodiment of the present invention.

Reference will now be made in detail to embodiments of the present invention, examples of which are illustrated in the accompanying drawings, wherein like reference numerals refer to like elements throughout. The embodiments are described below in order to explain the present invention by referring to the figures.

FIG. 1 is a control block diagram of a network system, according to an embodiment of the present invention. As shown in FIG. 1, the network system includes a client 300 and a host 100, to which the client 300 is connected through a network.

The host 100 includes a first network module 120 transmitting/receiving data through the network and a first controller 110, with the first controller 110 checking a data transmitting/receiving state of the first network module 120, and with the first network module 120 transmitting corresponding operation state data of the data transmitting/receiving state of the first network module 120 to the client 300.

The client 300 may include a display 330 displaying a picture thereon, a second network module 320 receiving the operation state data from the host 100, and a second controller 310 controlling the display 330 to display information about the data transmitting/receiving state of the host 100 according to the operation state data received from the second network module 320.

Hereinafter, the client 300 will be referenced by computer 30 (FIG. 2) and computer 30' (FIG. 8), as examples, but not limited thereto, and may include various network supporting devices, as long as it is connected to the host 100 through a network and capable of transmitting data to and receiving data from the host 100.

Figure 2:
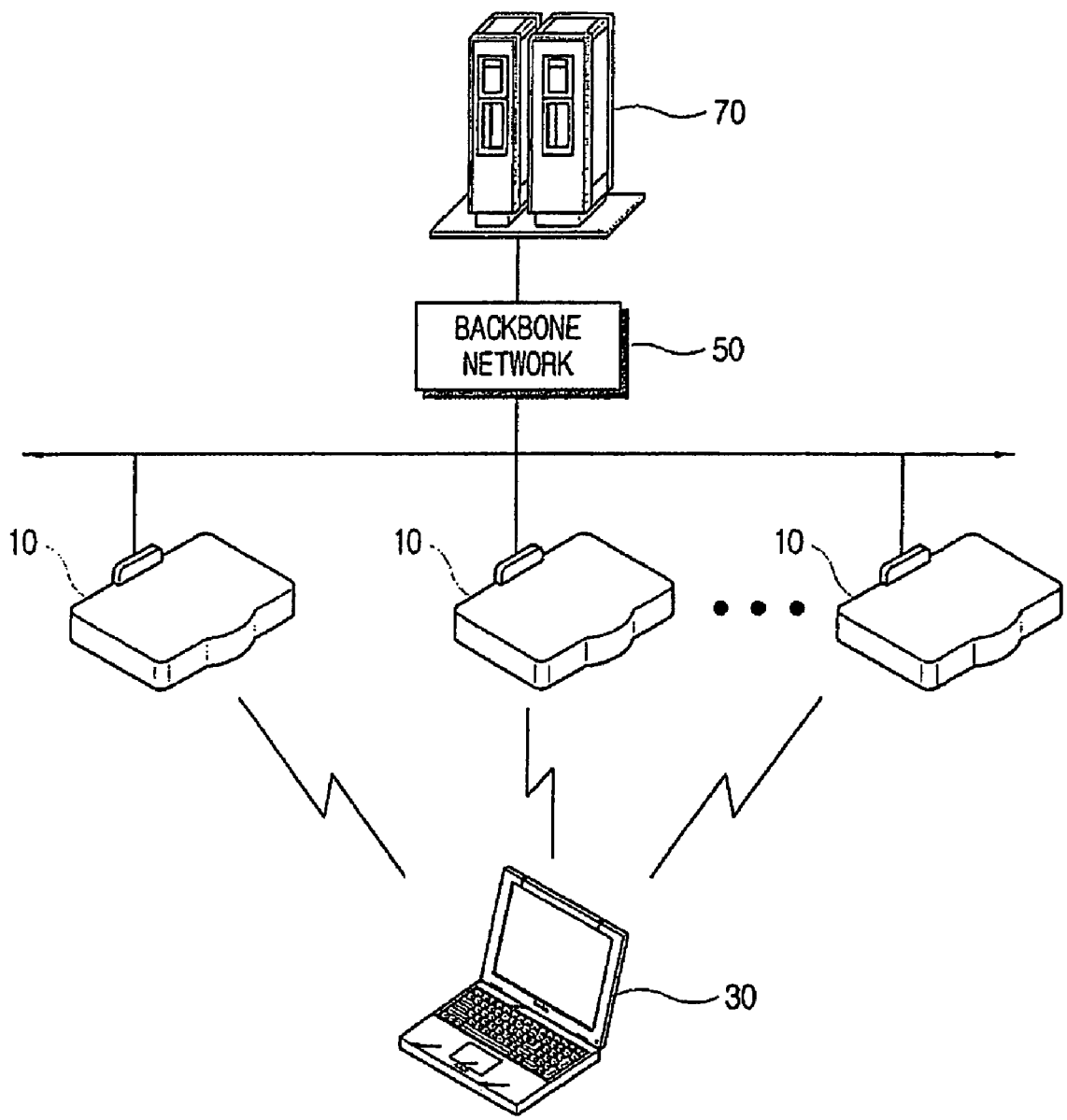
FIG. 2 illustrates a network system, according to another embodiment of the present invention.

FIG. 2 illustrates a network system, according to an embodiment of the present invention. In this network system, an access point 10 is used as the host 100 to support a wireless network, and computer 30 is employed as the client 300 and connected to the access point 10 through a wireless network.

As shown in FIG. 2, the network system includes the access point 10 providing interworking service between a wireless LAN service area and a wired LAN service area, with the computer 30 wirelessly transmitting/receiving data through the access point 10.

Here, the wireless network between the access point 10 and the computer 30 may be based on an international electrical & electronics engineering (IEEE) 802.11 specification, by way of example, but is not limited thereto.

The access point 10 manages the network within its own service area, and is connected to a network server 70 through a backbone network 50, thereby supporting wired/wireless interworking services between the network server 70 and the computer 30. Further, the access point 10 may periodically output a "beacon" signal, allowing the computer 30 to recognize that the computer 30 is located within the service area of the access point 10, as well as transmit information about the access point 10 to the computer 30. Here, the service areas of respective access points 10 may overlap each other, and thus the computer 30 may be located within a shared service area of two or more access points 10.

Figure 3:
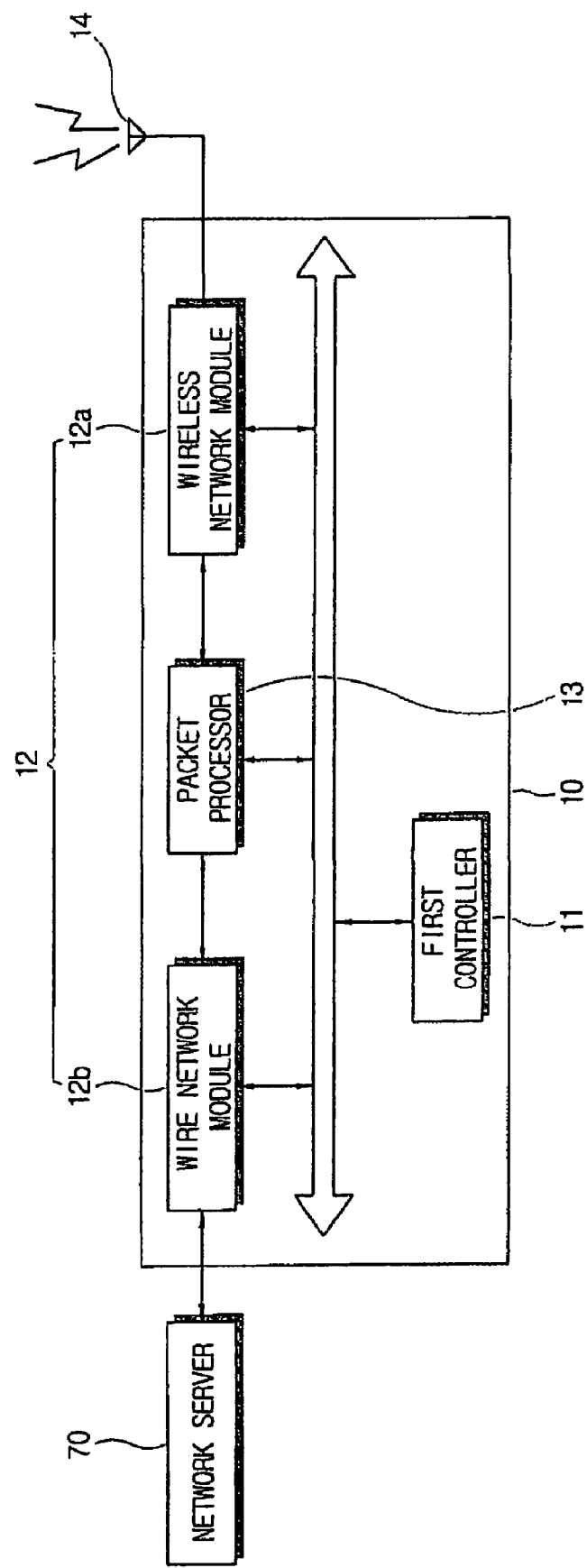
FIG. 3 is a control block diagram of an access point, according to an embodiment of the present invention.

FIG. 3 is a control block diagram of the access point 10, according to an embodiment of the present invention. As shown in FIG. 3, the access point 10 may include an antenna 14, a first network module 12 having a wireless network module 12a and a wired network module 12b, a packet processor 13, and a first controller 11 controlling the same.

The wireless network module 12a receives data through the antenna 14 and transmits it to the packet processor 13. Here, the data received by the wireless network module 12a may include a data packet based on an IEEE 802.11 specification. The packet processor 13 decodes the data packet and transmits it to the network server 70 through the wired network module 12b. Further, the packet processor 13 encodes the data received through the wired network module 12b and transmits it to the computer 30 through the wireless network module 12a, thereby acting as a relay between the network server 70 and the computer 30.

The first controller 11 can check a data transmitting/receiving state of the first network module 12 and create operation state data corresponding to the data transmitting/receiving state. Further, the first controller 11 may then transmit the created operation state data to the computer 30 through the wireless network module 12a.

According to an embodiment of the present invention, the first controller 11 embeds the operation state data in a beacon signal in order to transmit the operation state data.

Figure 4:
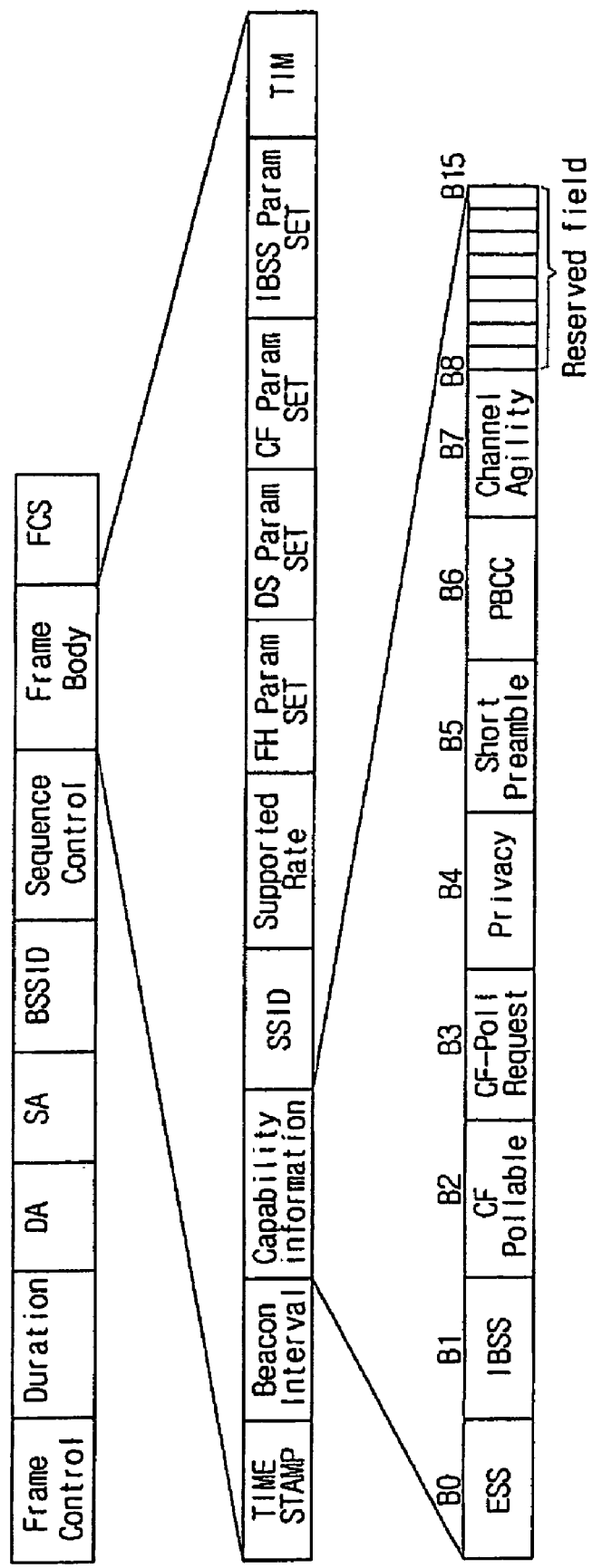
FIG. 4 illustrates a frame of a beacon signal transmitted from an access point, according to an embodiment of the present invention.

FIG. 4 illustrates a data frame of a beacon signal based on the IEEE 802.11 specification. Here, fields of the data frame are based on a well-known IEEE 802.11 specification, and therefore their detailed descriptions will be avoided.

Referring to FIG. 4, the data frame includes a frame body field. The frame body field includes a plurality of sub-fields, such as a capability information field. Further, the capability information field further includes a plurality of sub-fields. Here, the capability information field forms two octets, wherein a portion from a bit-8 to a bit-15 is allocated to a reserved field, presently unassigned. According to an embodiment of the present invention, the first controller 11 records the operation state data in the reserved field of the capability information field so as to transmit the operation state data, e.g., to computer 30.

Meanwhile, the operation state data of the network system may include information about a first connection state, corresponding to a wireless data transmitting/receiving state between other clients 300, shown in FIG. 1, connected to the access point 10 and/or between the computer 30 and the access point 10.

For example, information about the first connection state can include authentication information about the client trying to access the access point 10. That is, the first controller 11 may calculate a ratio of access or authentication failure frequencies to access or authentication attempt frequencies for a client and the access point 10 during a preset period, and then may add the calculated ratio, as the information about the first connection state, to the operation state data. Here, when an access failure or authentication failure rate per preset period is beyond a predetermined rate, e.g., 80%, the computer 30 may determine that the access point 10 is in trouble.

Further, the information about the first connection state can further include information about a wireless data transmitting/receiving error between the access point 10 and a client (s) connected to the access point 10. For example, the information about the first connection state can include information about a retried packet rate between the access point 10 and the client, per a predetermined period. That is, the first controller 11 may retry receiving data packet from the computer 30 when there is trouble in receiving the data packet. At this time, the first controller 11 can calculate a ratio of the retried packets to the whole data packets received from the computer 30 during a predetermined period, and then add the calculated ratio, as the information about the first connection state, to the operation state data. Alternatively, the first controller 11 may calculate a ratio of the retried packet to the whole data packets, transmitted to the computer 30 during a predetermined period, and then add that ratio, as the information about the first connection state, to the operation state data.

Also, the information about the wireless data transmitting/receiving error can include information about a cyclic redundancy checking (CRC) error rate, per a predetermined period. For example, the first controller 11 can calculate a ratio of the CRC error packets to the whole data packets, per a predetermined period, and then add that ratio to the operation state data.

Additionally, the operation state data, according to an embodiment of the present invention, may include information about a second connection state corresponding to a wired data transmitting/receiving state between the network server 70 and the access point 10. Therefore, the operation state data may include information about some trouble in the wired network, between the network server 70 and the access point 10. For example, the first controller 11 may periodically transmit a packet Internet groper (PING) to the network server 70, to check the network server 70. At this time, the first controller 11 can calculate an irresponsiveness rate, with respect to the PING toward the network server 70 per a predetermined period, and then add that calculated rate to the operation state data.

The following Table 1 illustrates that a first controller 11, according to an embodiment of the present invention, e.g., FIG. 2, can record operation state data, e.g., in a beacon signal. For example, the first controller 11 may allocate the operation state data to the bit-8 and bit-9 of the aforementioned capability information field, wherein the bit-8 and the bit-9 are recorded as "00" when the access point 10 is in normal operation, as "01" when the access/authentication failure rate is beyond a predetermined rate, as "10" when the wireless data transmitting/receiving error rate is beyond a predetermined rate, and as "11" when the wired data transmitting/receiving error rate is beyond a predetermined rate. Thus, the operation state data of the access point 10 can be embedded in the beacon signal and then output to any potential client.

TABLE 1

| Bit-8 | Bit-9 | Operation state of Access point |
|---|---|---|
| 0 | 0 | Normal operation |
| 0 | 1 | High access/authentication failure rate |
| 1 | 0 | High wireless data transmitting/receiving error rate |
| 1 | 1 | High wired data transmitting/receiving error rate |

Further, the operation state data, according to embodiments of the present invention, may also include auxiliary information to define a sub-state in more detail, with respect to information about the first connection state and/or the second connection state, for example.

The auxiliary information can include more detailed information about the access/authentication failure rate of the information about the first connection state. For example, as shown in the following Table 2, the auxiliary information may include information that the access failure rate is high for only one client, the access failure rate is high at two or more clients, the authentication failure rate is high for only one client, and/or the authentication failure rate is high for two or more clients, thereby providing more detailed information about the access point 10 to the computer 30, e.g., a user at the computer 30.

By way of example, the first controller 11, according to an embodiment of the present invention, may allocate the auxiliary information to a bit-14 and a bit-15 of the aforementioned capability information field, so as to transmit the auxiliary information.

TABLE 2

| Bit-14 | Bit-15 | Auxiliary information |
|---|---|---|
| 0 | 0 | High access failure rate for one client |
| 0 | 1 | High access failure rate for two or more clients |
| 1 | 0 | High authentication failure rate for one client |
| 1 | 1 | High authentication failure rate for two or more clients |

Meanwhile, the computer 30 used as the client 300 (shown in FIG. 1), according to embodiments of the present invention, will be further described with reference to FIG. 5.

Figure 5:
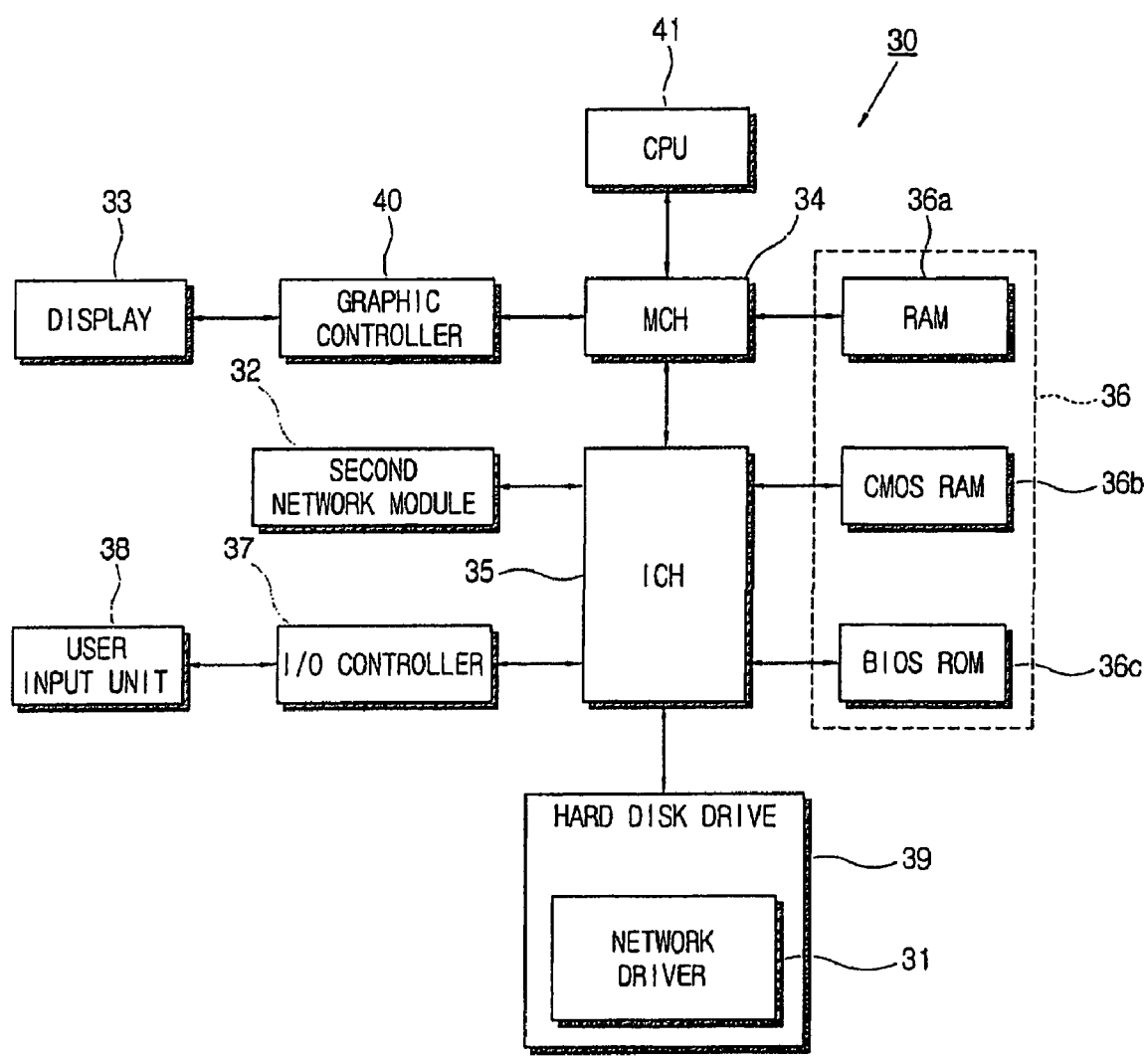
FIG. 5 is a control block diagram of a computer, according to an embodiment of the present invention.

As shown in FIG. 5, the computer 30 may include a central processing unit (CPU) 41, a graphic controller 40 connected to a display 33 and outputting a video signal to the display 33, a memory control hub (MCH) 34, and an input/output control hub (ICH) 35.

A memory unit 36 may include a random access memory (RAM) 36a, as a nonvolatile memory, a basic input/output system (BIOS)—read only memory (ROM) 36c, storing a start-up routine such as BIOS booting, and a complementary metal oxide semiconductor (CMOS) RAM 36b.

The memory control hub 34 may control the RAM 36a, and manage data communication among the CPU 41, the RAM 36a, and the graphic controller 40. Here, the graphic controller 40 can also be integrally provided with the memory control hub 34 as a single chipset, e.g., a graphic memory control hub (GMCH).

The input/output control hub 35 may manage data communication among the RAM 36a, connected to the memory control hub 34, and the other components, such as the BIOS ROM 36c, the CMOS RAM 36b, a hard disk drive 39, and an I/O controller 37, except for the graphic controller 40, for example.

A user input unit 38 may include various devices, such as a keyboard, a mouse, a touch pen, a touch screen, etc., as long as it can be handled by a user to input a signal. Here, the I/O controller 37 may control the signal input through the user input unit 38.

Further, the computer 30, according to an embodiment of the present invention, may include a second network module 32 to be wirelessly connected to the access point 10. Here the operation state data can be received from the access point 10 through the second network module 32.

Preferably, though not limited thereto, the second controller 310 (shown in FIG. 1) of the computer 30, as shown in FIG. 5, may include a network driver 31 to control the second network module 32. However, the second controller 310 may also be a separate application program based on an operating system (OS) or a built-in function of the OS. Hereinbelow, it will be supposed that the network driver 31 is used as the second controller 310 of the computer 30, according to an embodiment of the present invention.

Network driver 31 may be embodied in computer readable code controlling operations of embodiments of the present invention, with the computer readable code being resident in a computer readable medium. The computer readable medium can be any data storage device that can store or transmit data which can be thereafter read by a computer system. Examples of the computer readable media include read-only memory (ROM), random-access memory (RAM), CD-ROMs, magnetic tapes, hard disk drives, floppy disks, optical data storage devices, wave guides, and carrier waves (such as data transmission through the Internet or wireless networks, for example). The computer readable medium can also be distributed over network coupled computer systems so that the computer readable code can be stored/transmitted and executed in a distributed fashion.

Thus, herein the network driver 31 will be described as being stored in the hard disk drive 39, for example, and control the second network module 32 to transmit/receive data or perform other network relevant functions. Further, the network driver 31 may detect the operation state data included in a beacon signal, for example, from the data received through the second network module 32. Also, the network driver 31 may allow the information about the data transmitting/receiving state of the access point 10 to be displayed on the display 33, based on the received operation state data.

Figure 6:
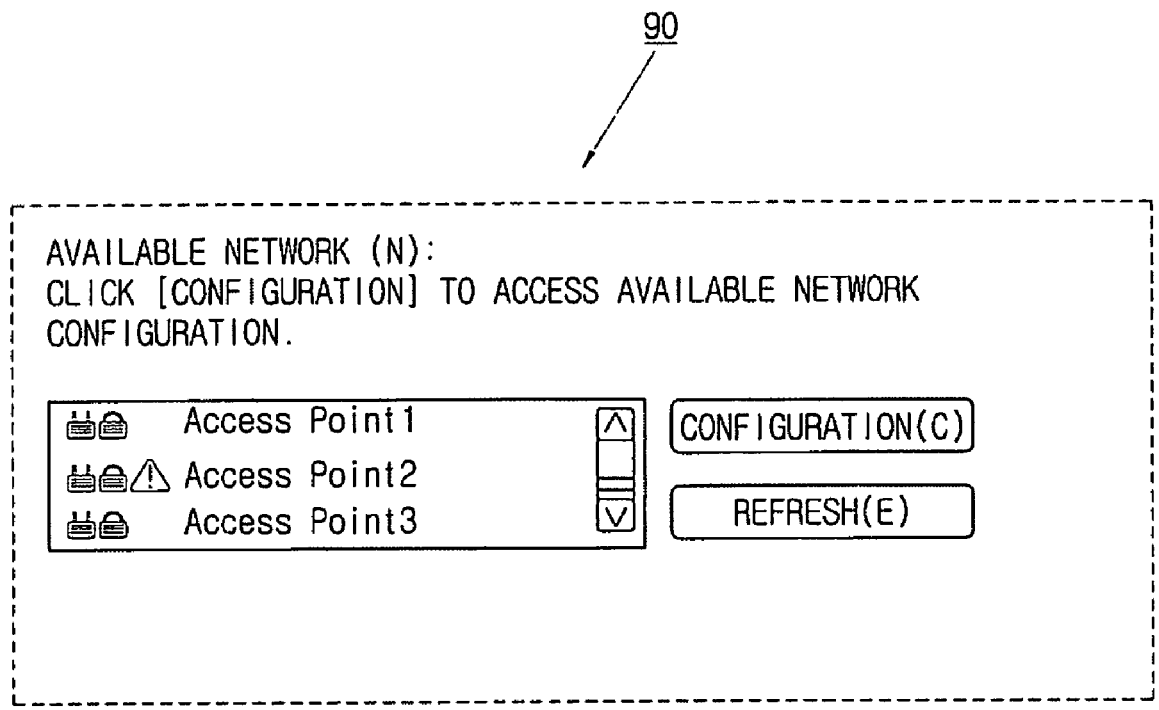
FIG. 6 illustrates access point information displayed on a computer, according to an embodiment of the present invention.

FIG. 6 illustrates information about a data transmitting/receiving state of the access point 10, by way of example, as displayed on the display 33, shown in FIG. 5. As depicted therein, a user interface 90 may show a list of the access points 10 available to a computer 30 and an icon identifying the operation state of each access point 10, thereby providing a user with the information about the data transmitting/receiving state of each access point 10. In FIG. 6, "" is used to indicate that the access point #2 is in trouble.

Here, when a user selects one of the access points 10, from the list of access points 10, the network driver 31 visually informs a user of more detailed information, e.g., based on Tables 1 and 2, for the selected access point 10, by various methods, e.g., via displayed text.

Hence, a user can connect a computer 30 to an available access point 10, which is not in trouble, by referring to the operation states of the respective access points 10 displayed on the user interface 90.

Figure 7:
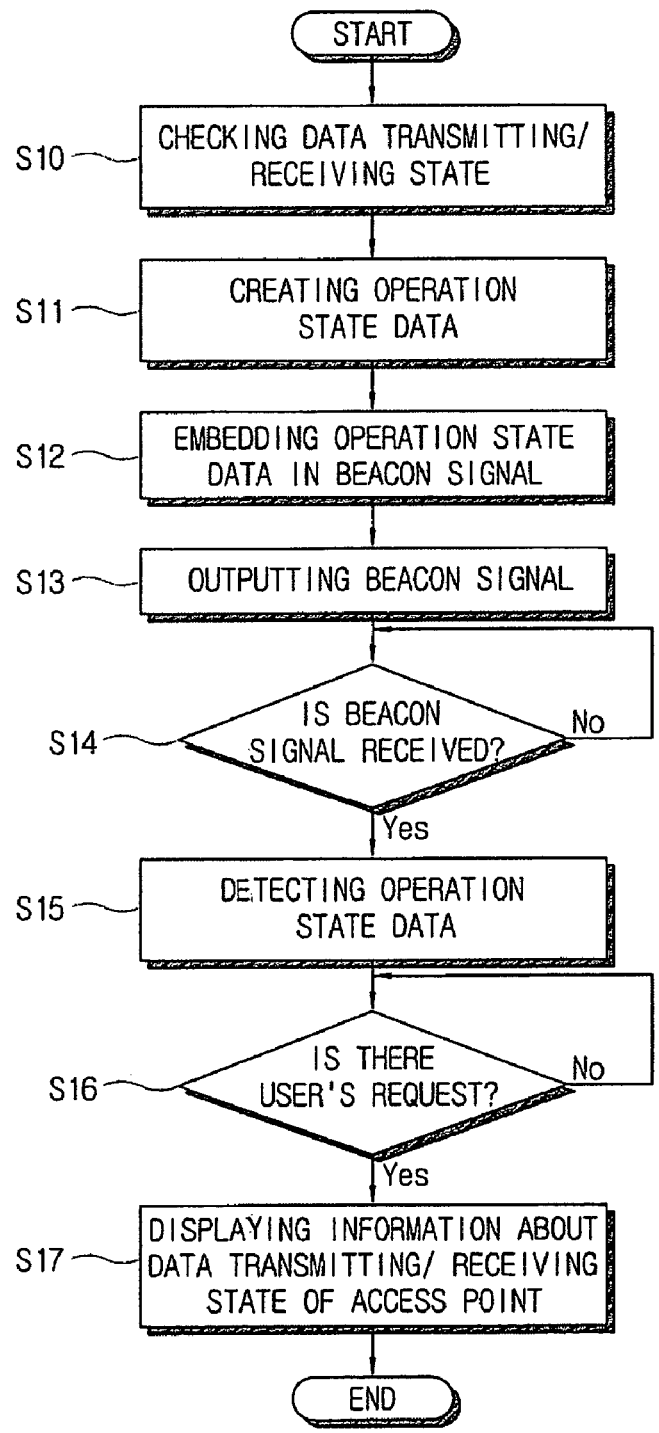
FIG. 7 is a control flowchart of a network system, according to an embodiment of the present invention.

With this configuration, operations of the network system according to another embodiment of the present invention will be described with reference to FIG. 7.

In operation S10, a first controller 11 of an access point 10 checks the operation state of the access point 10, that is, checks the data transmitting/receiving state related to a first network module 12 of the access point 10. Here, the first controller 11 checks the operation state of the access point 10 as described above.

In operation S11, the first controller 11 creates operation state data corresponding to the data transmitting/receiving state of the access point 10. In operation S12, the first controller 11 embeds the operation state data in a beacon signal, for example. In operation S13, the first controller 11 outputs the beacon signal, available to a computer 30, through the first network module 12.

Then, in operation S14, when the computer 30 receives the beacon signal of the access point 10, through a second network module 32, a network driver 31 of the computer 30 detects, in operation S15, the operation state data of the access point 10 from the received beacon signal. Herein, the network driver 31 may display the data transmitting/receiving state of the access point 10 on a display 33, for example, based on the received operation state data, in operation S17. Further, for example, in operation S16, when a user's request is input through the user input unit 38, the network driver 31 allows, in operation S17, the information about the data transmitting/receiving state of the access point 10 to be displayed on the display 33.

According to embodiments of the present invention, an operation state data of an access point 10 can be embedded in a beacon signal and output from the access point 10. However, according to other embodiments, the operation state data of the access point 10 may be outputted separately from the beacon signal, through a predetermined communication protocol.

Figure 8:
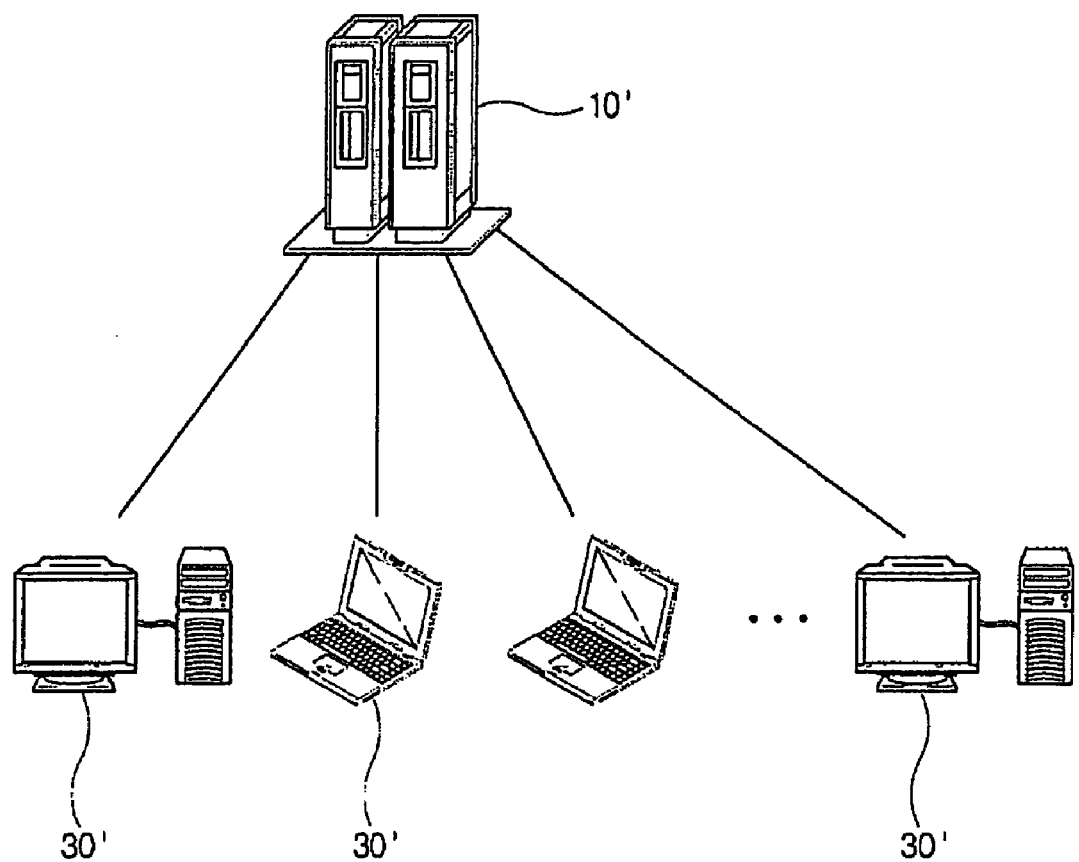
FIG. 8 illustrates a network system, according to another embodiment of the present invention.

FIG. 8 is a view of illustrating a network system, according to another embodiment of the present invention. In this network system, a server 10' corresponds to the host 100 (shown in FIG. 1) and supports a wired network, and a computer(s) 30' corresponds to the client 300 (shown in FIG. 1) and connects to the server 10' through the wired network.

In the network system of FIG. 8, the server 10' sends operation state data including information about a data transmitting/receiving state to the relevant computer 30'.

Here, the operation state data of the network system, according to this embodiment of the present invention, is based on a predetermined protocol between the server 10' and the computer 30', so that the computer 30' can recognize the operation state data output from the server 10'. Further, a reserved field or a predetermined field of a data packet based on a well-known protocol, such as a transmission control protocol/Internet protocol (TCP/IP), etc., can be allocated for recording the operation state data of the server 10', thereby allowing the computer 30' to recognize the operation state data.

In the case where the network system, according to the FIG. 8 embodiment of the present invention, is achieved by just interchanging a network system similar to aforementioned embodiment from the wireless networks to a wired network, the configurations and the operations of the network system according to the aforementioned embodiments can be equally applied to the wired network, without departing from the principles and spirit of the invention.

As described above, there are provided the host 100 including the first network module 120, and the first controller 110 checking a data transmitting/receiving state related to the first network module 120 and outputting operation state data about the data transmitting/receiving state related to the first network module 120 through the first network module 120, and the client 300 including the display 330, the second network module 320 receiving the operation state data from the host 100, and the second controller 310 controlling the display 330 to display information about the data transmitting/receiving state of the host 100 on the basis of the operation state data received through the second network module 320.

As described above, the present invention provides a computer, an access point, a network system and a control method thereof, in which a host can provide a client with operation state data corresponding to a data transmitting/receiving state of the host, thereby allowing a user to check the data transmitting/receiving state of the host computer.

Although a few embodiments of the present invention have been shown and described, it will be appreciated by those skilled in the art that changes may be made in these embodiments without departing from the principles and spirit of the invention, the scope of which is defined in the appended claims and their equivalents.

What is claimed is:

1. A network system, comprising:
    a host comprising a first network module and a first controller checking a data transmitting/receiving state of the first network module and outputting operation state data corresponding to the data transmitting/receiving state of the first network module; and a client comprising a display, a second network module connected to the host and receiving the operation state data from the host, and a second controller controlling the display to display information about the data transmitting/receiving state of the first network module of the host based on the operation state data received through the second network module, wherein the host further comprises an access point to which the client is wirelessly connected through a wireless network, wherein the operation state data includes information about a first connection state corresponding to a wireless data transmitting/receiving state between at least one other client connected to the access point and the access point and/or between the client and the access point, and wherein the information about the first connection state includes at least one of authentication information about the client trying to access the access point and information about a wireless data transmitting/receiving error between the access point and the client and/or between the access point and the other client.

2. The network system according to claim 1, wherein the first controller embeds the operation state data in a beacon signal, transmitted by the host, to transmit the operation state data.

3. The network system according to claim 2, wherein the first controller records the operation state data in a capability information field of a frame body of the beacon signal.

4. The network system according to claim 1, wherein the information about the wireless data transmitting/receiving error includes at least one of information about a retried packet rate per a predetermined period and information about a cyclic redundancy checking (CRC) error rate per a predetermined period.

5. The network system according to claim 1, further comprising a network server connected to the access point through a wired network, wherein
the operation state data includes information about a second connection state corresponding to a wired data transmitting/receiving state between the network server and the access point.

6. The network system according to claim 1, further comprising a network server connected to the access point through a wired network, wherein
the operation state data includes information about a second connection state corresponding to a wired data transmitting/receiving state between the network server and the access point.

7. The network system according to claim 6, wherein the information about the second connection state includes information about an irresponsiveness rate with respect to a PING from the access point toward the network server.

8. The network system according to claim 6, wherein the operation state data includes auxiliary information to define a sub-state with respect to information about the first connection state and/or the second connection state.

9. The network system according to claim 1, wherein the host comprises a server to which the client is wire-connected.

10. An access point relaying data transmission between a network server and a client, the access point comprising:
a wireless network module wirelessly communicating with the client; and
a controller checking a data transmitting/receiving state related to the wireless network module and transmitting operation state data corresponding to the data transmitting/receiving state through the wireless network module, wherein the controller embeds the operation state data in a beacon signal and transmits the beacon signal to the client through the wireless network module, wherein the operation state data includes information about a first connection state corresponding to a wireless data transmitting/receiving state between at least one other client connected to the access point through the wireless network module and the access point and/or between the client and the access point, and wherein the information about the first connection state includes at least one of authentication information about the client trying to access the access point and information about a wireless data transmitting/receiving error between the access point and the client and/or between the access point and the other client.

11. The access point according to claim 10, wherein the controller records the operation state data in a capability information field of a frame body of the beacon signal.

12. The access point according to claim 10, wherein the information about the wireless data transmitting/receiving error includes at least one of information about a retried packet rate per a predetermined period and information about a cyclic redundancy checking (CRC) error rate per a predetermined period.

13. The access point according to claim 10, further comprising a wired network module wire-connected to and wire-communicating with the network server, wherein
the operation state data includes information about a second connection state corresponding to a wired data transmitting/receiving state between the network server and the access point.

14. The network system according to claim 13, wherein the information about the second connection state includes information about an irresponsiveness rate with respect to a PING from the access point toward the network server.

15. The network system according to claim 10, wherein the operation state data includes auxiliary information to define a sub-state with respect to information about the first connection state and/or the second connection state.

16. The access point according to claim 10, further comprising a wired network module wire-connected to and wire-communicating with the network server, wherein
the operation state data includes information about a second connection state corresponding to a wired data transmitting/receiving state between the network server and the access point.

17. The network system according to claim 16, wherein the information about the second connection state includes information about an irresponsiveness rate with respect to a PING from the access point toward the network server.

18. The network system according to claim 16, wherein the operation state data includes auxiliary information to define a sub-state with respect to information about the first connection state and/or the second connection state.

19. A computer communicating with a host through a wireless network, the computer comprising:
a display displaying a picture;
a wireless network module communicating with the host through the network; and
a controller detecting operation state data from data received through the wireless network module, from the network, and controlling the display to display information about a data transmitting/receiving state of the host on the basis of the detected operation state data, wherein the host further comprises an access point to which the computer is wirelessly connected through a wireless network wherein the controller embeds the operation state data in a beacon signal and transmits the beacon signal to a client through the wireless network module, wherein the operation state data includes information about a first connection state corresponding to a wireless data transmitting/receiving state between at least one other client connected to the access point through the wireless network module and the access point and/or between the client and the access point, and wherein the information about the first connection state includes at least one of authentication information about the client trying to access the access point and information about a wireless data transmitting/receiving error between the access point and the client and/or between the access point and the other client.

20. A method of controlling a network system comprising a host and a client communicating with the host, the method comprising:

creating operation state data corresponding to a data transmitting/receiving state of the host;

outputting the operation state data from the host;

receiving the operation state data output from the host, by the client; and allowing the client to display information about the data transmitting/receiving state of the host based on the operation state data, wherein the host comprises an access point to which the client is wirelessly connected through a wireless network, and the creating of the operation state data comprises embedding the operation state data in a beacon signal, wherein the creating of the operation state data includes detecting information about a first connection state corresponding to a wireless data transmitting/receiving state between at least one other client connected to the access point and the access point and/or between the client and the access point, and wherein the detecting of the information about the first connection state includes at least one of detecting authentication information about the client trying to access the access point and detecting information about a wireless data transmitting/receiving error between the access point and the client and/or between the access point and the other client.

21. The method according to claim 20, wherein the detecting of the information about the wireless data transmitting/receiving error includes at least one of detecting information about a retried packet rate per a predetermined period and detecting information about a cyclic redundancy checking (CRC) error rate per a predetermined period.

22. A method of controlling a network system comprising a host and a client communicating with the host, the method comprising:

creating operation state data corresponding to a data transmitting/receiving state of the host;

outputting the operation state data from the host;

receiving the operation state data output from the host, by the client; and allowing the client to display information about the data transmitting/receiving state of the host based on the operation state data, wherein the host comprises an access point to which the client is wirelessly connected through a wireless network, and the creating of the operation state data comprises embedding the operation state data in a beacon signal, and wherein the network system comprises a network server connected to the access point through a wired network, and the creating of the operation state data includes detecting information about a second connection state corresponding to a wired data transmitting/receiving state between the network server and the access point.

23. The method according to claim 22, wherein the detecting of the information about the second connection state includes calculating an irresponsiveness rate with respect to a PING from the access point toward the network server.

* * * * *